United States Patent
Gunderson

(10) Patent No.: US 11,907,570 B2
(45) Date of Patent: Feb. 20, 2024

(54) PREDICTIVE MEDIA MANAGEMENT FOR READ DISTURB

(71) Applicant: Micron Technology, Inc., Boise, ID (US)

(72) Inventor: Daniel James Gunderson, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 413 days.

(21) Appl. No.: 16/801,072

(22) Filed: Feb. 25, 2020

(65) Prior Publication Data

US 2021/0263679 A1    Aug. 26, 2021

(51) Int. Cl.
*G06F 3/06* (2006.01)
*G06F 1/14* (2006.01)
*G06F 11/14* (2006.01)

(52) U.S. Cl.
CPC .......... *G06F 3/0659* (2013.01); *G06F 3/0619* (2013.01); *G06F 3/0653* (2013.01); *G06F 3/0673* (2013.01); *G06F 11/1402* (2013.01)

(58) Field of Classification Search
CPC .... G06F 3/0659; G06F 3/0619; G06F 3/0653; G06F 3/0673; G06F 11/1402; G06F 11/1471; G06F 2201/82; G06F 3/064; G06F 3/0679; G06F 3/0655; G06F 11/1469; G06F 2201/81
See application file for complete search history.

(56) References Cited

U.S. PATENT DOCUMENTS

| | | | |
|---|---|---|---|
| 11,023,138 B2* | 6/2021 | Navon | G06F 12/0246 |
| 2014/0237298 A1* | 8/2014 | Pe'er | G11C 16/3418 |
| | | | 714/42 |
| 2014/0298119 A1 | 10/2014 | Laberge et al. | |
| 2014/0380123 A1 | 12/2014 | Liikanen et al. | |
| 2016/0110124 A1* | 4/2016 | Camp | G06F 11/073 |
| | | | 714/704 |
| 2016/0299812 A1* | 10/2016 | Olbrich | H03M 13/05 |

(Continued)

FOREIGN PATENT DOCUMENTS

| | | |
|---|---|---|
| CN | 102084430 A | 6/2011 |
| CN | 103210376 A | 7/2013 |

(Continued)

OTHER PUBLICATIONS

Chinese Patent Office, "Office Action," issued in connection with Chinese Patent Application No. 202110209976.X dated Oct. 11, 2023 (9 pages) (3 pages of English Translation and 6 pages of Original Document).

*Primary Examiner* — Matthew M Kim
*Assistant Examiner* — Matthew N Putaraksa
(74) *Attorney, Agent, or Firm* — Holland & Hart LLP

(57) ABSTRACT

Methods, systems, and devices for predictive media management for read disturb are described. A read disturbance manager can monitor a bit error rate for a block of a memory die. The read disturbance manager can detect that a degradation of the bit error rate satisfies a degradation threshold specific to the memory die. In some cases, the read disturbance manager can perform a write operation to write data from the block of the memory die to a second block of the memory die based on detecting that the degradation of the bit error rate satisfies the degradation threshold.

18 Claims, 4 Drawing Sheets

(56) References Cited

U.S. PATENT DOCUMENTS

| | | | |
|---|---|---|---|
| 2017/0139761 A1* | 5/2017 | Song | G06F 12/02 |
| 2017/0213597 A1* | 7/2017 | Micheloni | G11C 16/12 |
| 2017/0308438 A1* | 10/2017 | Yim | G11C 16/349 |
| 2019/0004964 A1* | 1/2019 | Kanno | G06F 12/0246 |
| 2019/0065118 A1* | 2/2019 | Muralimanohar | G11C 13/0002 |
| 2019/0066803 A1* | 2/2019 | Bhatia | G11C 16/26 |
| 2019/0171381 A1* | 6/2019 | Ioannou | G06F 3/0679 |
| 2019/0265888 A1* | 8/2019 | Yang | G11C 11/5671 |
| 2019/0324664 A1* | 10/2019 | Kim | G06F 3/0683 |
| 2019/0339902 A1* | 11/2019 | Yanes | G06F 3/0688 |
| 2020/0066362 A1* | 2/2020 | Zhu | G11C 16/3495 |
| 2020/0409578 A1* | 12/2020 | Brittner | G06F 3/0604 |
| 2021/0026564 A1* | 1/2021 | Her | G11C 29/52 |
| 2021/0157921 A1* | 5/2021 | Brown | G06F 21/575 |
| 2021/0202012 A1* | 7/2021 | Han | G06F 3/0659 |
| 2021/0257041 A1* | 8/2021 | Kim | G06F 3/0625 |
| 2021/0263821 A1* | 8/2021 | Yang | G11C 29/028 |
| 2021/0382769 A1* | 12/2021 | Liang | G06F 11/0793 |
| 2021/0397349 A1* | 12/2021 | Cabral | G06F 11/1076 |
| 2022/0342560 A1 | 10/2022 | Reimers | |

FOREIGN PATENT DOCUMENTS

| | | |
|---|---|---|
| CN | 104008773 A | 8/2014 |
| CN | 108139871 A | 6/2018 |

\* cited by examiner

PREDICTIVE MEDIA MANAGEMENT FOR READ DISTURB

TECHNICAL FIELD

The following relates generally to a memory sub-system and more specifically to predictive media management for read disturb for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
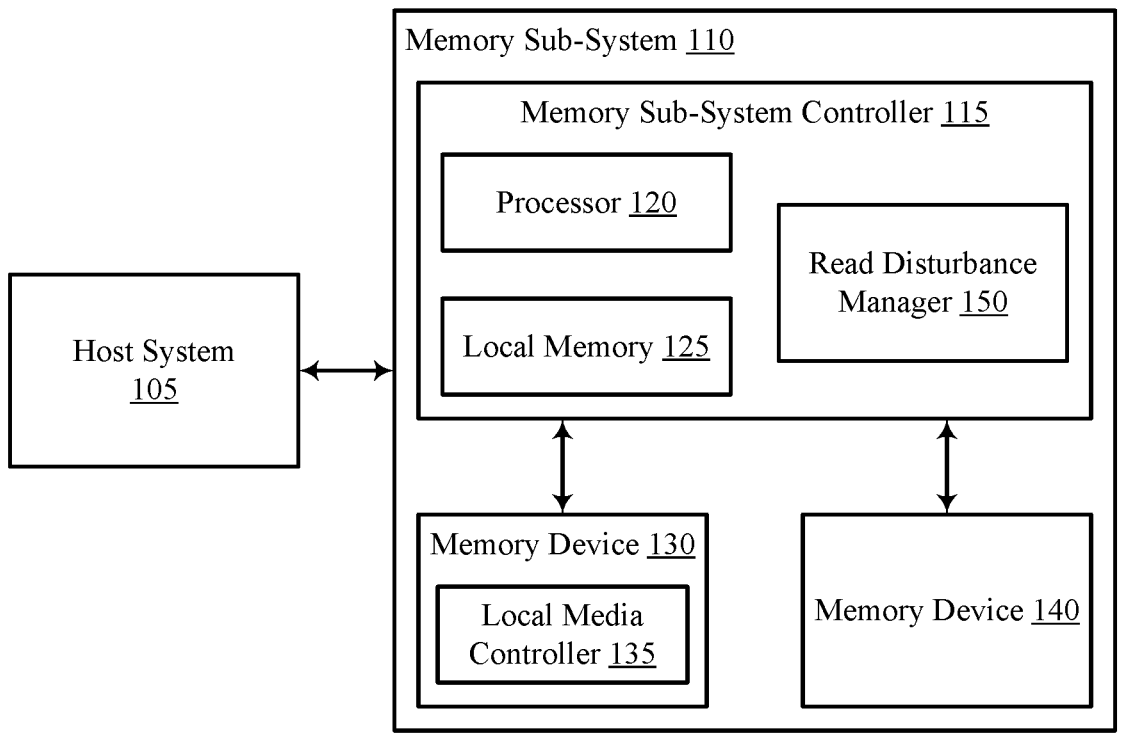
FIG. 1 is an example of a computing system that includes a memory sub-system in accordance with some embodiments of the present disclosure.

Aspects of the present disclosure are directed to predictive media management for read disturb. A memory sub-system can be a storage device, a memory module, or a hybrid of a storage device and memory module. Examples of storage devices and memory modules are described herein in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A data block hereinafter refers to a unit of the memory device used to store data and can include a group of memory cells, a word line group, a word line, or individual memory cells.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

In conventional systems, reading memory cells (e.g., NAND memory cells) can cause nearby memory cells in the same block to change over time (e.g., become programmed). This is known as a read disturb. A counter can be used to track read events that affect a block. When the read events satisfy a predetermined threshold, the affected block can be rewritten in another location (e.g., a different block). The predetermined threshold can indicate how many times the block can be disturbed before the data is unrecoverable. If the predetermined threshold is too large, data can be at risk of loss, being unrecoverable, or both. If the predetermined threshold is too small, the memory device performance can be degraded. In some case, the predetermined threshold can be characterized on a sample size and then used for all memory devices. In such cases, the predetermined threshold cannot be optimized on a per memory device basis.

If the predetermined threshold is the same for every memory device, data can be lost from the memory device which can result in the memory device experiencing a performance loss, increased signaling overhead, and increased processing overhead for performing read and write operations. In conventional systems, setting a constant threshold across multiple memory device can decrease performance of the memory dies by losing data during a write operation, increasing power consumption to recover the lost data, being unable to recover the lost data, or the like.

Aspects of the present disclosure address the above and other deficiencies by having a memory sub-system that monitors the read bit error rate degradation over time via a read disturb monitoring algorithm. In some cases, the monitored read bit error rate can be used to predict when the block should be rewritten to another block. In such cases, the algorithm can ensure an optimum trade-off between user performance and data recovery reliability. Rather than using a predefined, constant threshold, the system can monitor the bit error rate for each memory die to predict at what point the system cannot read back data from the block. For example, the data collected (e.g., via monitoring the bit error rate) can be used to predict when a rewrite should be implemented. In such cases, the system can implement a die by die based read disturb threshold instead of using a predefined read disturb threshold.

In some cases, the system can monitor the bit error rate for a block and determine that a degradation of the bit error rate satisfies a degradation threshold (e.g., exceeds or equals the threshold). In such cases, the system can perform a write operation to write the data to a different block based on determining that the bit error rate satisfies the degradation threshold. By implementing a die specific degradation threshold, the overall performance of the memory sub-system can be increased. For example, by determining whether the degradation of the bit error rate satisfies the degradation threshold for the particular memory die, the overall efficiency of the memory sub-system can be improved by preventing a loss of data and preventing an inability to recover lost data. Such techniques can result in the memory sub-system experiencing improved read and write speeds, reduced power consumption, and improved processing times.

Features of the disclosure are initially described in the context of a computing environment as described with reference to FIG. 1. Features of the disclosure are described in the context of systems as described with reference to FIGS. 2 and 3. These and other features of the disclosure are further illustrated by and described with reference to a computer system that relates to predictive media management for read disturb as described with reference to FIG. 4.

FIG. 1 is an example of a computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some embodiments, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, USB interface, Fiber Channel, Small Computer System Interface (SCSI), Serial Attached SCSI (SAS), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize a non-volatile memory Express (NVMe) interface to access the components (e.g., memory device(s) 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device(s) 140) can be, but are not limited to, random access memory (RAM), such as dynamic RAM (DRAM) and synchronous DRAM (SDRAM).

Some examples of non-volatile memory devices (e.g., memory device 130) include negative-and (NAND) type flash memory and write-in-place memory, such as three-dimensional cross-point ("3D cross-point") memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some examples, a particular memory component can include an SLC portion, and an MLC portion, a TLC portion, a QLC portion of memory cells, or a PLC portion. The memory cells of the memory devices 130 can be grouped as memory pages or memory blocks that can refer to a unit of the memory component used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric RAM (FeRAM), magneto RAM (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination of such. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 and/or the memory device 140 as well as convert responses associated with the memory devices 130 and/or the memory device 140 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a read disturbance manager 150 that can monitor the bit error rate for a block of a memory die (e.g., memory device 130, memory device 140, memory component(s) of memory device 130, memory component(s) of memory device 140) of memory sub-system 110. In some cases, the bit error rate approaches (e.g., increases) to a threshold bit error rate that can result in the memory die losing data and having to operate in a data recovery mode to perform data recovery, if able. In such cases, the read disturbance manager 150 can rewrite the data from the block of the memory die to a second block of the memory die. The read disturbance manager 150 can read back the data rewritten to the second block to ensure a successful write operation (e.g., that the rewritten data corresponds to the data from the block of the memory die). In some case, the read disturbance manager 150 can detect an error in the rewritten data. In such cases, the read disturbance manager 150 can initiate the data recovery mode to recover the data when an error is detected.

In some examples, the memory sub-system controller 115 includes at least a portion of the read disturbance manager 150. For example, the memory sub-system controller 115 can include a processor 120 (e.g., a processing device) configured to execute instructions stored in local memory 125 for performing the operations described herein. In some examples, the read disturbance manager 150 is part of the host system 105, an application, or an operating system.

In some cases, the read disturbance manager 150 can prevent the memory die from entering the data recovery mode by measuring the bit error rate and detecting that the degradation of the bit error rate satisfies a degradation threshold. For example, the read disturbance manager 150 can determine that the degradation of the bit error rate is equal to or exceeds the degradation threshold. Further details with regards to the operations of the read disturbance manager 150 are described herein.

Figure 2:
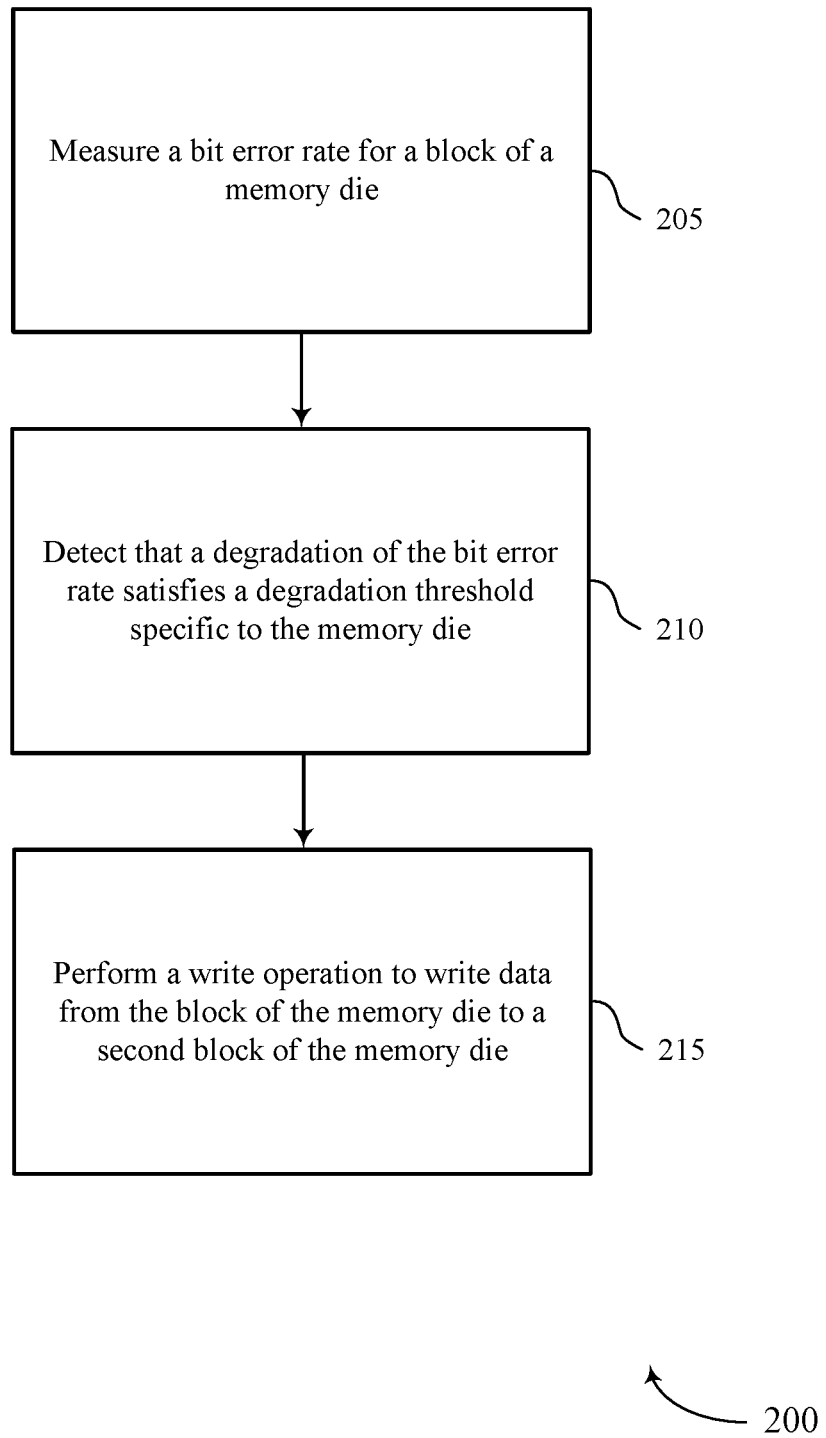
FIG. 2 is a flow diagram of an example method for predictive media management for read disturb in accordance with some embodiments of the present disclosure.

FIG. 2 is a flow diagram of an example method 200 to predictive media management for read disturb in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the read disturbance manager 150 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

At operation 205, the processing device can measure a bit error rate for a block of a memory die. For example, the processing device can monitor the bit error rate. In some examples, aspects of the operations of 205 can be performed by the read disturbance manager.

At operation 210, the processing device can detect that a degradation of the bit error rate satisfies a degradation threshold specific to the memory die. The processing device can detect that the degradation of the bit error rate is equal to or exceeds the degradation threshold. In some examples, the processing device can determine that the block is unable to be read if the degradation of the bit error rate is detected to satisfy the degradation threshold. The degradation threshold can be associated with read operations performed on the block of the memory die. For example, the processing device can determine the degradation of the bit error rate based on a number of read operations that trigger a data recovery procedure for the block of the memory die. In other examples, the degradation threshold can be based on a configuration of the memory die. For example, the degradation threshold can be different than a degradation threshold for a second memory die. In some examples, aspects of the operations of 210 can be performed by the read disturbance manager.

At operation 215, the processing device can perform a write operation to write data from the block of the memory die to a second block of the memory die. For example, the processing device can write data from the block of the memory die to a second block of the memory die. In some examples, the processing device can perform the write operation based on determining that the block is unable to read, based on a number of read operations detected, or both. In other examples, the processing device can perform the write operation based on performing an unsuccessful test read operation.

In some cases, after writing data from the block of the memory die to the second block of the memory die, the processing device can perform a read operation on the second block of the memory die. If an error is detected in the second block, the processing device can perform a recovery procedure to retrieve data from the second block. In some examples, aspects of the operations of 215 can be performed by the read disturbance manager.

Figure 3:
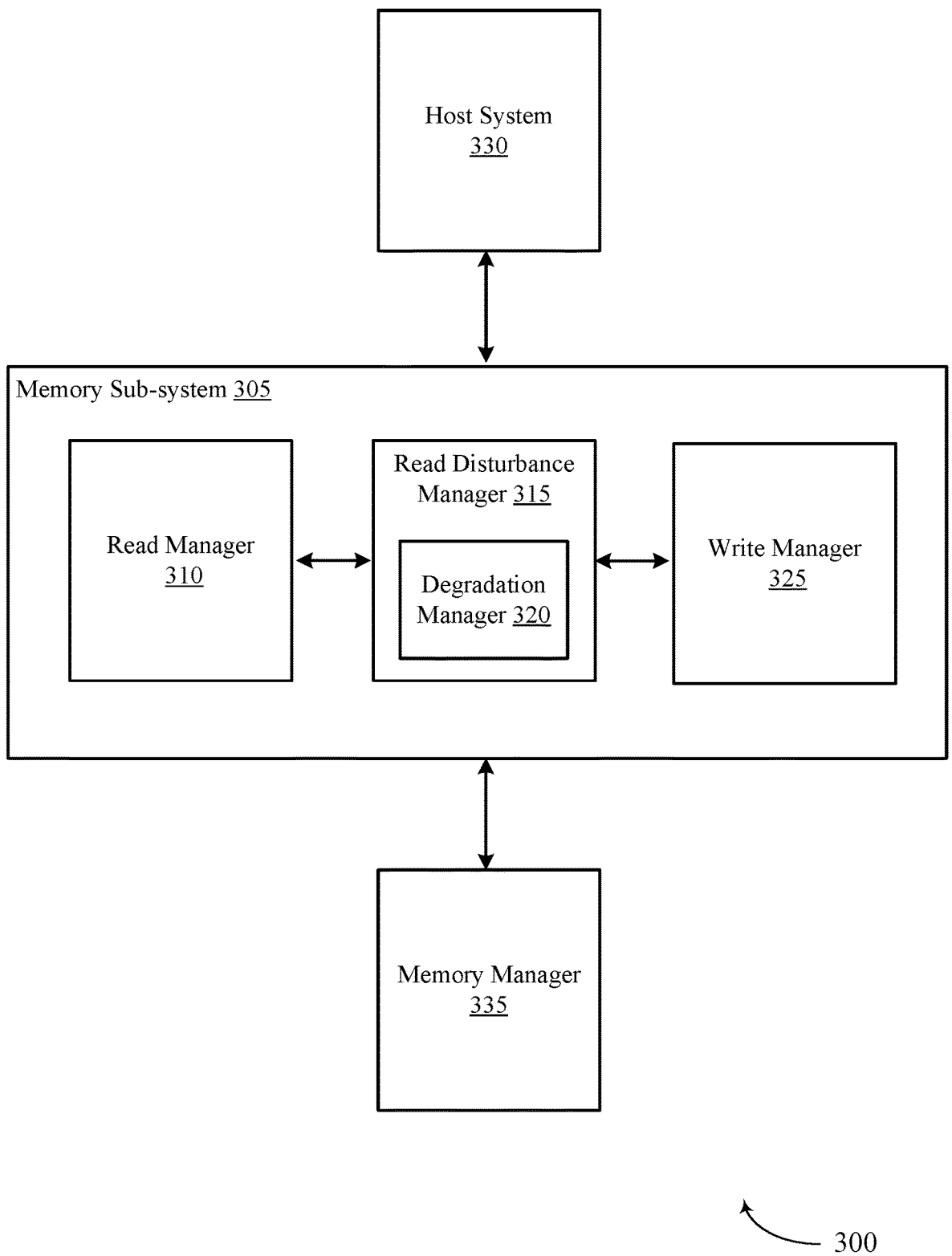
FIG. 3 is a diagram of an example system for predictive media management for read disturb in accordance with some embodiments of the present disclosure.

FIG. 3 is an example of a system 300 for predictive media management for read disturb in accordance with some embodiments of the present disclosure. The system 300 can include memory sub-system 305. Memory sub-system 305 can include read manager 310, read disturbance manager 315, degradation manager 320, and write manager 325. The system 300 can also include host system 330 and memory manager 335.

The read disturbance manager 315 can be in communication with the read manager 310 and the write manager 325. The read disturbance manager 315 can monitor (e.g., measure) a bit error rate of the block of the memory sub-system 305. If the degradation of the bit error rate satisfies a degradation threshold, the read disturbance manager 315 can determine (e.g., detect) that the block is unable to be read. The bit error rate can be a function of a number of read operations versus time.

In some cases, the read disturbance manager 315 can identify a degradation of the bit error rate. For example, the read disturbance manager 315 can identify a point in time when the bit error rate has degraded by a threshold amount, and the write manager 325 can be instructed to rewrite the data. The threshold amount of a bit error rate degradation can be based on a data recovery rate, a data recovery depth, the bit error rate, or a combination thereof.

The read disturbance manager 315 can include a degradation manager 320. The degradation manager 320 can determine that the degradation of the bit error rate for the block satisfies the degradation threshold specific to the memory sub-system 305. For example, the degradation manager 320 can determine that the degradation of the bit error rate is equal to the degradation threshold. In other examples, the degradation manager 320 can determine that the degradation of the bit error rate exceeds the degradation threshold.

The degradation threshold can be associated with read operations performed on the block of the memory sub-system 305. For example, the degradation manager 320 can determine the degradation threshold based on determining the number of read operations that triggers the data recovery procedure for the block. In such cases, the read disturbance manager 315 can determine a number of read operations that triggers a data recovery procedure for the block and can set the degradation threshold according to the number of read operations.

In some cases, the degradation threshold can be associated with data recovery for the memory sub-system 305. For example, the memory sub-system 305 can include a bit error rate that results in the memory sub-system 305 entering a data recovery mode. In some examples, the degradation threshold is specific to each memory die of the memory sub-system 305. For example, the degradation threshold specific to a first die of the memory sub-system 305 can be different than a second degradation threshold specific to a second memory die of the memory sub-system 305. In such cases, the degradation threshold is based on a configuration of the memory die or the memory sub-system 305. For example, the degradation threshold can be configured prior to a user receiving the memory sub-system 305.

The read disturbance manager 315 can be in communication with the write manager 325. For example, the read disturbance manager 315 can send a notification, to the write manager 325, that the bit error rate satisfies the degradation threshold. In such cases, the write manager 325 can perform a write operation to write data from the block of the memory sub-system 305 to a second block of the memory sub-system 305. In some cases, the write manager 325 can perform the write operation based on determining that the block is unable to read (e.g., determining that the bit error rate satisfies the degradation threshold). In some examples, the write manager 325 can perform a write operation based on a number of read operations that trigger a data recovery procedure. For example, the degradation threshold can be based on the number of read operations that trigger the data recovery procedure. In such cases, the bit error rate can satisfy the degradation threshold when the number of read operations that triggers the data recovery procedure exceeds a threshold.

The read disturbance manager 315 can be in communication with the read manager 310. To prevent the block from entering the data recovery mode, the read manager 310 can check soft data (e.g., data that cannot be detected as an error). For example, the read manager 310 can perform a test read operation on a block of the memory sub-system 305 prior to performing a read operation on the block of the memory sub-system 305. In some cases, the read manager 310 can determine that the test read operation is unsuccessful. In such cases, the write manager 325 can perform the write operation based on the unsuccessful test read operation. The unsuccessful test read operation can indicate that the block can enter the data recovery mode. For example, when the test read operation is unsuccessful, the read manager 310 can indicate to the write manager 325 to write the data to a different block.

In some cases, the read manager 310 can perform a read operation on a second block of the memory sub-system 305. The read operation on a second block can occur after the write manager 325 writes data from the block of the memory sub-system 305 to the second block of the memory sub-system 305. In some case, the read manager 310 can detect an error in the second block based on performing the read operation. In such cases, the read manager 310 can perform a recovery procedure to retrieve data of the second block.

Figure 4:
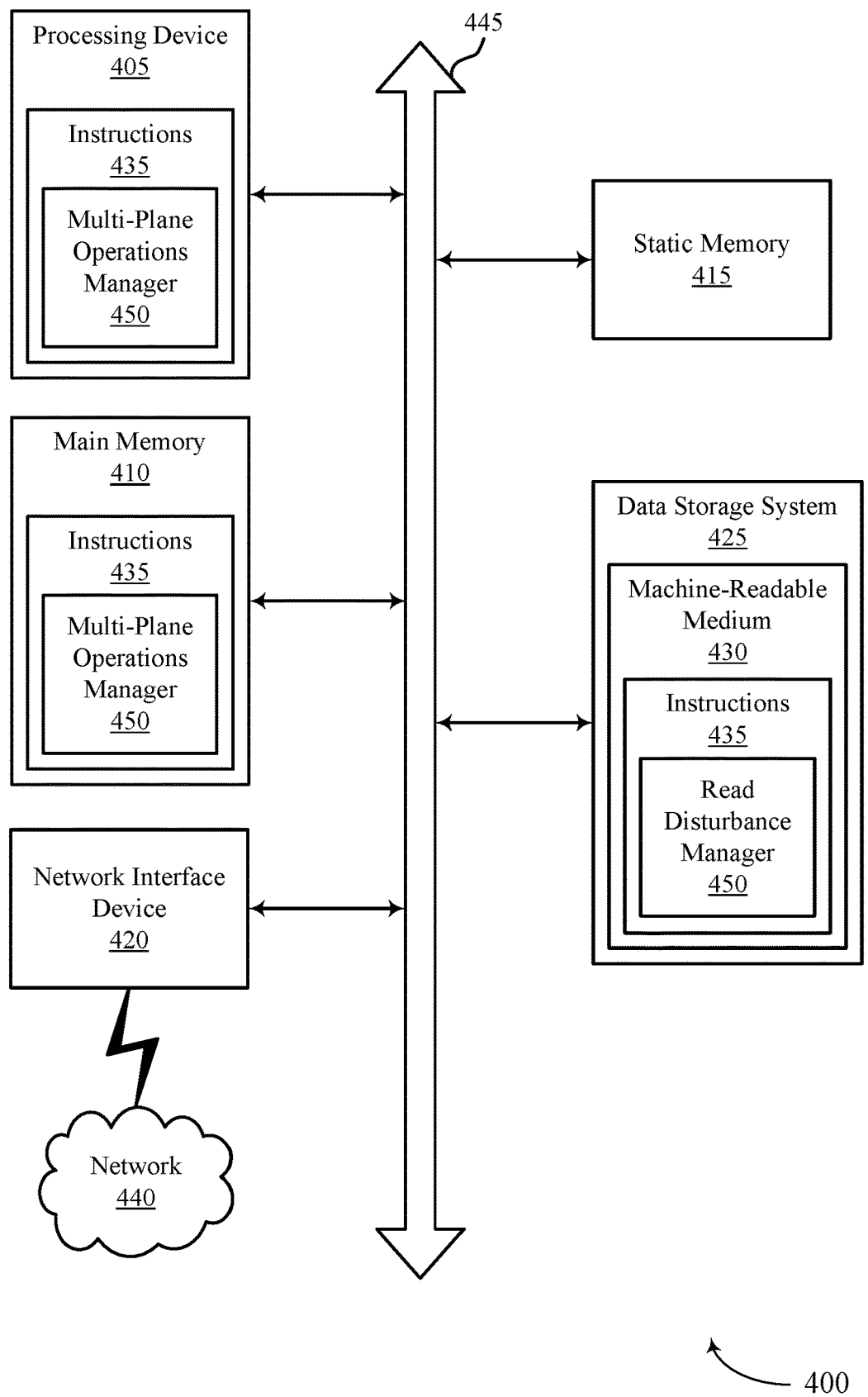
FIG. 4 is a block diagram of an example computer system in which examples of the present disclosure can operate.

FIG. 4 illustrates is an example machine of a computer system 400 in which examples of the present disclosure can operate. The computer system 400 can include a set of instructions, for causing the machine to perform any one or more of the techniques described herein. In some examples, the computer system 400 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the read disturbance manager 150 described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 400 can include a processing device 405, a main memory 410 (e.g., ROM, flash memory, DRAM such as SDRAM or Rambus DRAM (RDRAM), etc.), a static memory 415 (e.g., flash memory, static RAM (SRAM), etc.), and a data storage system 425, which communicate with each other via a bus 445.

Processing device 405 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 405 can also be one or more special-purpose processing devices such as an ASIC, an FPGA, a DSP, network processor, or the like. The processing device 405 is configured to execute instructions 435 for performing the operations and steps discussed herein. The computer system 400 can further include a network interface device 420 to communicate over the network 440.

The data storage system 425 can include a machine-readable storage medium 430 (also known as a computer-readable medium) on which is stored one or more sets of instructions 435 or software embodying any one or more of the methodologies or functions described herein. The instructions 435 can also reside, completely or at least partially, within the main memory 410 and/or within the processing device 405 during execution thereof by the computer system 400, the main memory 410 and the processing device 405 also constituting machine-readable storage media. The machine-readable storage medium 430, data storage system 425, and/or main memory 410 can correspond to a memory sub-system.

In one example, the instructions 435 include instructions to implement functionality corresponding to a read disturbance manager 450 (e.g., the read disturbance manager 150 described with reference to FIG. 1). While the machine-readable storage medium 430 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method, comprising:
   receiving, from a host system at a memory sub-system, a read command to read data from a first block of a first memory die of the memory sub-system;
   performing a test read operation on the first block prior to performing a read operation on the first block;
   performing the read operation to read the data from the first block;
   monitoring, at the memory sub-system, a bit error rate for the first block of the first memory die based at least in part on performing the read operation;
   determining, at the memory sub-system and based at least in part on the monitoring, that a degradation of the bit error rate for the first block of the first memory die satisfies a first degradation threshold specific to the first memory die and different from a second degradation threshold specific to a second memory die of the memory sub-system, the first degradation threshold associated with read operations performed on the first block of the first memory die, wherein the first degradation threshold is set according to a number of read operations that triggers a data recovery procedure for the first block; and
   performing a write operation to write the data from the first block of the first memory die to a second block of the first memory die based at least in part on determining that the bit error rate satisfies the first degradation threshold or on an unsuccessful test read operation.

2. The method of claim 1, wherein determining that the degradation of the bit error rate satisfies the first degradation threshold comprises:
   determining that the degradation of the bit error rate is equal to or exceeds the first degradation threshold.

3. The method of claim 1, further comprising:
   determining that the first block is unable to be read based at least in part on determining that the degradation of the bit error rate satisfies the first degradation threshold, wherein performing the write operation is based at least in part on determining that the first block is unable to read.

4. The method of claim 1, further comprising:
   determining the number of read operations that triggers the data recovery procedure for the first block, wherein the write operation is performed based at least in part on the number of read operations.

5. The method of claim 1, further comprising:
   performing a read operation on the second block based at least in part on performing the write operation to write the data from the first block of the first memory die to the second block of the first memory die;
   detecting an error in the second block based at least in part on performing the read operation on the second block; and
   performing a recovery procedure to retrieve the data of the second block based at least in part on detecting the error.

6. The method of claim 1, wherein the first degradation threshold is based at least in part on a configuration of the first memory die or the memory sub-system.

7. A system comprising:
   a plurality of memory components; and
   a processing device, operatively coupled with the plurality of memory components, to:
   receive, from a host system at a memory sub-system, a read command to read data from a first block of a first memory die of the memory sub-system;
   perform a test read operation on the first block prior to performing a read operation on the first block;
   perform the read operation to read the data from the first block;
   detect, at the memory sub-system and based at least in part on performing the read operation, that a bit error rate degradation for the first block of the first memory die satisfies a first degradation threshold specific to the first memory die and different from a second degradation threshold specific to a second memory die of the memory sub-system, the first degradation threshold associated with data recovery for the first memory die, wherein the first degradation threshold is set according to a number of read operations that triggers a data recovery procedure for the first block; and
   write the data from the first block of the first memory die to a second block of the first memory die based at least in part on detecting that the bit error rate degradation satisfies the first degradation threshold or on an unsuccessful test read operation.

8. The system of claim 7, further comprising:
   the processing device to:
   detect that the bit error rate degradation is equal to or exceeds the first degradation threshold.

9. The system of claim 7, further comprising:
   the processing device to:
   detect that the first block is unable to be read based at least in part on detecting that the bit error rate degradation satisfies the first degradation threshold, wherein writing the data from the first block of the first memory die to the second block is based at least in part on detecting that the first block is unable to read.

10. The system of claim 7, further comprising:
    the processing device to:
    determine the number of read operations that triggers the data recovery procedure for the first block, the processing device to write the data based at least in part on the number of read operations.

11. The system of claim 7, further comprising:
    the processing device to:

perform a read operation on the second block based at least in part on writing the data from the first block of the first memory die to the second block of the first memory die;

detecting an error in the second block based at least in part on performing the read operation on the second block; and performing a recovery procedure to retrieve the data of the second block based at least in part on detecting the error.

12. The system of claim 7, wherein the first degradation threshold is based at least in part on a configuration of the first memory die or the memory sub-system.

13. A non-transitory computer-readable storage medium comprising instructions that, when executed by a processing device, cause the processing device to:

receive, from a host system at a memory sub-system, a read command to read data from a first block of a first memory die of the memory sub-system;

perform a test read operation on the first block prior to performing a read operation on the first block;

perform the read operation to read the data from the first block;

monitor, at the memory sub-system, a bit error rate for the first block of the first memory die based at least in part on performing the read operation;

determine, at the memory sub-system and based at least in part on the monitoring, that a degradation of the bit error rate for the first block of the first memory die satisfies a first degradation threshold specific to the first memory die and different from a second degradation threshold specific to a second memory die of the memory sub-system, the first degradation threshold associated with read operations performed on the first block of the first memory die, wherein the first degradation threshold is set according to a number of read operations that triggers a data recovery procedure for the first block; and perform a write operation to write the data from the first block of the first memory die to a second block of the first memory die based at least in part on determining that the bit error rate satisfies the first degradation threshold or on an unsuccessful test read operation.

14. The non-transitory computer-readable storage medium of claim 13, wherein the instructions, when executed by the processing device, further cause the processing device to:

determine that the degradation of the bit error rate is equal to or exceeds the first degradation threshold.

15. The non-transitory computer-readable storage medium of claim 13, wherein the instructions, when executed by the processing device, further cause the processing device to:

determine that the first block is unable to be read based at least in part on determining that the degradation of the bit error rate satisfies the first degradation threshold, wherein performing the write operation is based at least in part on determining that the first block is unable to read.

16. The non-transitory computer-readable storage medium of claim 13, wherein the instructions, when executed by the processing device, further cause the processing device to:

determine the number of read operations that triggers the data recovery procedure for the first block, wherein the write operation is performed based at least in part on the number of read operations.

17. The non-transitory computer-readable storage medium of claim 13, wherein the instructions, when executed by the processing device, further cause the processing device to:

perform a read operation on the second block based at least in part on performing the write operation to write the data from the first block of the first memory die to the second block of the first memory die;

detect an error in the second block based at least in part on performing the read operation on the second block; and perform a recovery procedure to retrieve the data of the second block based at least in part on detecting the error.

18. The non-transitory computer-readable storage medium of claim 13, wherein the first degradation threshold is based at least in part on a configuration of the first memory die or the memory sub-system.

* * * * *